(12) United States Patent
Jacobs et al.

(10) Patent No.: US 9,498,931 B2
(45) Date of Patent: Nov. 22, 2016

(54) ENERGY EFFICIENT CONSTRUCTION MATERIALS

(75) Inventors: Jeffry L. Jacobs, Stillwater, MN (US); Jeffrey A. Peterson, Lake Elmo, MN (US); Christopher A. Haak, Oakdale, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 1697 days.

(21) Appl. No.: 11/601,094

(22) Filed: Nov. 17, 2006

(65) Prior Publication Data

US 2007/0218251 A1    Sep. 20, 2007

Related U.S. Application Data

(60) Provisional application No. 60/740,702, filed on Nov. 30, 2005.

(51) Int. Cl.
*B32B 5/22* (2006.01)
*B32B 5/16* (2006.01)
*B32B 11/02* (2006.01)
(Continued)

(52) U.S. Cl.
CPC . *B32B 5/22* (2013.01); *B32B 5/16* (2013.01); *B32B 7/12* (2013.01); *B32B 11/02* (2013.01); *B32B 11/046* (2013.01); *B32B 11/10* (2013.01); *B32B 11/12* (2013.01); *B32B 17/04* (2013.01); *B32B 27/06* (2013.01); *B32B 27/08* (2013.01); *B32B 27/14* (2013.01); *B32B 27/36* (2013.01); *C09D 5/004* (2013.01); *C09D 7/125* (2013.01); *C09D 7/1283* (2013.01); *E04D 1/20* (2013.01); *E04D 1/22* (2013.01); *B32B 2262/101* (2013.01); *B32B 2264/02* (2013.01); *B32B 2264/025* (2013.01); *B32B 2264/0285* (2013.01); *B32B 2264/102* (2013.01); *B32B 2264/12* (2013.01); *B32B 2307/412* (2013.01);
(Continued)

(58) Field of Classification Search
USPC .................................................. 428/141, 143
See application file for complete search history.

(56) References Cited

U.S. PATENT DOCUMENTS 3,479,201 A    11/1969  Sloan
3,610,724 A    10/1971  Frizzell
(Continued)

FOREIGN PATENT DOCUMENTS

EP          418809       9/1990
WO      WO 96/07538     3/1996
(Continued)

OTHER PUBLICATIONS

Author Unknown, CertainTeed Technical Data Sheets, XT30, XT25, CT20 Shingles, Copyright 2011, p. 2.*
(Continued)

*Primary Examiner* — Nathan Van Sell
(74) *Attorney, Agent, or Firm* — Daniel J. Iden

(57) ABSTRACT

A roofing shingle may include a substrate, granules and multilayer infrared light reflecting film particles. In some cases, a roofing shingle may include a substrate, granules and a multilayer infrared light reflecting film disposed either above or below the granules. Such roofing shingles may exhibit improved solar reflectivity. An infrared light reflecting mixture may include inorganic granules and polymeric multilayer infrared light reflecting film particles. An existing construction surface may be treated to improve its solar reflectivity.

12 Claims, 1 Drawing Sheet

(51) Int. Cl.
  *B32B 11/10* (2006.01)
  *B32B 17/04* (2006.01)
  *B32B 27/06* (2006.01)
  *B32B 27/08* (2006.01)
  *B32B 27/36* (2006.01)
  *E04D 1/20* (2006.01)
  *E04D 1/22* (2006.01)
  *C09D 5/33* (2006.01)
  *C09D 7/12* (2006.01)
  *B32B 7/12* (2006.01)
  *B32B 11/04* (2006.01)
  *B32B 11/12* (2006.01)
  *B32B 27/14* (2006.01)
  *E04D 1/00* (2006.01)

(52) U.S. Cl.
  CPC ..... *B32B 2307/416* (2013.01); *B32B 2419/06* (2013.01); *E04D 2001/005* (2013.01); *Y10T 428/24372* (2015.01)

(56) References Cited

U.S. PATENT DOCUMENTS

| | | | |
|---|---|---|---|
| 3,711,176 A | 1/1973 | Alfrey | |
| 4,446,305 A | 5/1984 | Rogers | |
| 4,540,623 A | 9/1985 | Im | |
| 4,916,014 A | 4/1990 | Weber | |
| 5,122,905 A | 6/1992 | Wheatley | |
| 5,126,880 A | 6/1992 | Wheatley | |
| 5,353,154 A | 10/1994 | Lutz | |
| 5,380,552 A | 1/1995 | George | |
| 5,448,404 A | 9/1995 | Schrenk | |
| 5,516,573 A | 5/1996 | George | |
| 5,814,367 A * | 9/1998 | Hubbard et al. | 427/162 |
| 5,882,774 A | 3/1999 | Jonza | |
| 6,045,894 A | 4/2000 | Jonza | |
| 6,174,360 B1 | 1/2001 | Sliwinski | |
| 6,352,761 B1 | 3/2002 | Hebrink | |
| 6,454,848 B2 | 9/2002 | Sliwinski | |
| 6,475,609 B1 * | 11/2002 | Whitney et al. | 428/212 |
| 6,531,230 B1 | 3/2003 | Weber | |
| 6,797,396 B1 | 9/2004 | Liu | |
| 6,821,609 B2 * | 11/2004 | Mende et al. | 428/178 |
| 2001/0022982 A1 | 9/2001 | Neavin | |
| 2002/0197449 A1 * | 12/2002 | Mende et al. | 428/166 |
| 2003/0068469 A1 | 4/2003 | Aschenbeck | |
| 2005/0072110 A1 * | 4/2005 | Shiao et al. | 52/741.1 |
| 2005/0145139 A1 | 7/2005 | Khan | |

FOREIGN PATENT DOCUMENTS

| | | |
|---|---|---|
| WO | WO 99/39224 | 8/1999 |
| WO | WO 99/56542 | 11/1999 |
| WO | WO 02/10244 | 2/2002 |

OTHER PUBLICATIONS

Timothy P. Marshall, Richard F. Herzog, and Scott J. Morrison, Hail Damage to Ashpalt Roof Shingles, Date Unknown, p. 1.*
Reflective Coatings—Cool Roof Solutions, Construction Specifier v. 58, Aug. 8, 2005, DeSouto, Michael (abstract).
Keeping Roofs Cool, Polymers Paint Colour Journal, v. 194 n 4483, Dec. 2004, p. 28-31, Pilcher, George. R. (abstract).
Cool Roofing, Polymers Paint Colour Journal, v. 194 n 4482, Nov. 2004. p. 42-46, Pilcher, George R.
Cool Roofing: A Really Hot Topic, JCT Coatings Tech, v. 1, n 4, Apr. 2004. p. 22-29. Cocuzzi, David.
Demonstrated Energy Savings of Cool Roof Coatings and Future Directions for Research, Interface, v. 15 n11, Nov. 1997, p. 8-10, 12, 14-17, Gartland, Lisa.
Space Age, Insulation, Jan. 2001, p. 8-9, Anon.
Angular Selective Thin Film Glazing, Renewable Energy, v. 15 n 1-4, pt. 1, Sep.-Dec. 1998, p. 183-188, Smith. G.B.

* cited by examiner

ENERGY EFFICIENT CONSTRUCTION MATERIALS

CROSS-REFERENCE

This application claims the benefit, under 35 U.S.C. §119(e) of Provisional Application Ser. No. 60/740,702, filed on Nov. 30, 2005, and is incorporated by reference herein.

BACKGROUND

The present invention relates to reflective materials and treatments for enhancing solar reflectivity for use on exterior surfaces such as on asphalt shingle roofs, roofing tiles, and other exterior surfaces and methods to reduce energy consumption costs for cooling buildings.

For energy conservation purposes, it has become more desirable to reflect solar energy from roofs and other exterior surfaces. Absorbed solar energy increases cooling energy costs in buildings. In addition, in densely populated areas, such as metropolitan areas, the absorption of solar energy increases ambient air temperatures. A primary absorber of solar energy is building roofs. It is not uncommon for ambient air temperature in metropolitan areas to be at least 10 degrees Fahrenheit warmer than in surrounding rural areas. This phenomenon is commonly referred to as the urban heat island effect. Reflecting solar energy rather than absorbing it can reduce cooling costs and thereby energy costs in buildings. In addition, reducing solar energy absorption can enhance the quality of life in densely populated areas by helping to decrease ambient air temperatures.

Reflection of solar energy can be accomplished by using white or light-colored roofs. However, such light-colored roofs are not well accepted in the marketplace for aesthetic reasons. Instead, darker roofs are preferred. However, darker roofs by their very nature absorb a higher degree of solar energy and reflect less. To diminish the absorption of solar energy without affecting the visible color of the roof, enhanced reflection in the infrared portion of the spectrum is desirable.

Non-flat or sloped roofs typically use shingles coated with colored granules adhered to the outer surface of the shingles. Such shingles are typically made of an asphalt base with the granules embedded in the asphalt. The roofing granules are used both for aesthetic reasons and to protect the underlying base of the shingle. The very nature of such granules creates significant surface roughness on the shingle. Solar radiation thereby encounters decreased reflectivity since the radiation is scattered in a multi-scattering manner that leads to increased absorption when compared to the same coating placed on a smooth surface.

Although construction materials may have sufficiently high solar energy reflectivity when they are installed, a variety of environmental factors tend to degrade that performance. Growth of microorganisms, such as algae, lichen, and moss, is a common problem on roofs in many areas especially those where exposed surfaces are often damp. In other regions, the deposit of air borne materials such as soot is a primary contributor to reduced solar energy reflectivity. These problems have been addressed as a nuisance appearance issue by the art.

The conflict between the aesthetic desire for darker construction surfaces and the energy efficiency which can be obtained through the higher solar energy rejection of white or near white surfaces has required a compromise that favors lighter colors. Although lighter colors may meet initial solar reflectivity standards such as that required for Energy Star® labeling, they tend to lose their reflectivity over time as dirt and microorganisms accumulate. Maintaining a useful or desired level of solar reflectivity for several years generally means that the initial reflectivity must be significantly higher than the eventual target and this, in turn, requires an even lighter, less desirable initial color.

In the case of the Energy Star® labeling standard, this decline in reflectivity has been recognized by the inclusion of an exposure aging requirement. The initial solar reflectivity for steep slope roofs must be equal to or greater than 25% and must remain greater than or equal to 15% after 3 years. It is desirable to maintain an even higher reflectivity. In regions having high pollution and/or moist conditions favorable for algal growth, it may be necessary to select materials with an even higher initial reflectivity, in some instances as high as 30%, in order to retain 15% reflectivity after 3 years.

SUMMARY

Generally, the present invention relates generally to infrared light reflecting construction surfaces and infrared light reflecting mixtures used to create such construction surfaces.

In one embodiment, the invention pertains to an infrared light reflecting mixture that includes about 99.95 to about 70 weight percent inorganic granules having a mean size that is between about 0.1 and about 5 millimeters and about 0.05 to about 30 weight percent polymeric multilayer infrared light reflecting film particles having a mean size that is between about 50 micrometers to about 5 millimeters.

In another embodiment, the invention pertains to a roofing shingle that includes a substrate, a number of granules that are secured to the substrate, and a number of multilayer infrared light reflecting film particles that are secured relative to the substrate.

In another embodiment, the invention pertains to a roofing shingle that includes a substrate, a number of granules that are secured relative to the substrate, and a multilayer infrared light reflecting film that is secured relative to the substrate.

In another embodiment, the invention pertains to a method including steps of applying to a construction surface a solution that includes a number of multilayer infrared light reflecting film particles, an adhesive and a carrier. The carrier is subsequently removed to form an infrared light reflecting treated construction surface.

The above summary of the present invention is not intended to describe each disclosed embodiment or every implementation of the present invention. The Figures, Detailed Description and Examples which follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
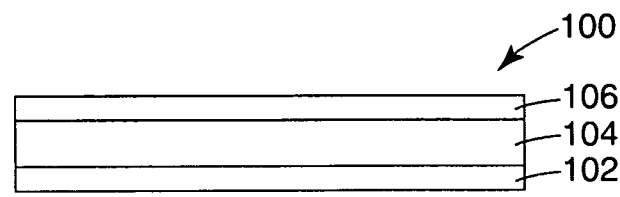
FIG. 1 is a diagrammatic cross-section of a roofing shingle in accordance with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention relates generally to infrared light reflecting construction surfaces. In some instances, infrared light reflecting refers to reflecting light within the near-infrared (NIR) range of about 700 to about 2500 nanometers. The NIR includes about 50 to about 60 percent of the sun's incident energy. In some cases, an infrared light reflecting material may reflect all or nearly all of incident light within this wavelength range. Some infrared light reflecting materials may reflect particular wavelength bands within this range. For example, some infrared light reflecting materials may reflect light within a band centered around 800 nanometers and/or around 1100 nanometers, as these are significant peaks in the IR spectrum.

While the invention is discussed generally with respect to roofing materials such as asphalt roofing shingles, it should be noted that other roofing materials such as roll roofing and flat roofs are within the scope of the invention. Moreover, it is contemplated that other construction surfaces may benefit from the infrared light reflecting materials discussed herein.

Solar reflectivity values of at least 25% meet the present solar reflectivity standard set forth by the U.S. Environmental Protection Agency (EPA) under the program entitled Energy Star®. The EPA permits manufacturers to use the designation Energy Star® for those roofing products that meet certain energy specifications In one respect, the present invention pertains to an infrared light reflecting mixture that includes inorganic granules and infrared light reflecting particles. As used herein, the term particles may include high aspect ratio particles, such as fibers. In some cases, a mixture may include about 50 to 95 volume percent inorganic granules and about 5 to 50 volume percent polymeric multilayer infrared light reflecting film particles. A mixture may, in some instances, include at least about 70 to about 99.95 weight percent of inorganic granules and about 0.05 to about 30 weight percent of polymeric multilayer infrared light reflecting film particles. A mixture may include about 80 to 90 weight percent inorganic granules and about 10 to 20 weight percent polymeric infrared light reflecting film particles. Each of these elements are discussed below.

The inorganic granules may include conventional granules as well as cool granules. In some instances, the conventional granules may be excluded, and only cool granules may be used. As used herein, "cool granule" refers to colored granules that reflect significant amounts of infrared light. Some shingles employing only cool granules may achieve Total Solar Reflectance (TSR) values as high as 25 or even 30 percent.

Total Solar Reflectance (TSR) refers to the fraction reflected of the incident solar radiation received on a surface perpendicular to the axis of the radiation within the wavelength range of 250 to 2500 nanometers as determined according to a modification of the ordinate procedure defined in ASTM Method C 1549. This method employs a portable solar reflectometer such as the Solar Spectrum Reflectomer Model SSR-ER available from Devices and Services Company in Dallas, Tex. This instrument uses a tungsten halogen lamp to illuminate a sample. Reflectance measurements are then collected at an angle of 20 degrees from the incident light at the following four wavelengths in the solar spectrum, 380 nanometers, 500 nanometers, 650 nanometers, and 1220 nanometers. These four measurements are then combined using a weighted average to approximate the response for incident solar radiation. An air mass of 1.5 was used. The instrument is calibrated using a black body cavity and a sample of known solar reflectance greater than zero.

The inorganic granules may be crushed, milled or otherwise treated to have a mean size of about 0.1 to about 5 millimeters. The mean size is intended to refer to an average size of a large number of individual granules, although it is intended that a majority of the granules used fall within the size range given above as size extremes may cause difficulties in adhering the granules to a shingle. In some cases, the granules may have a mean size that is about 0.3 millimeters to about 1.8 millimeters.

Any suitable material may be used for the granules. In some cases, the granules may be formed from any one of a wide class of rocks, minerals or recycled materials. Examples of rocks and minerals include basalt, diabase, gabbro, argillite, rhyolite, dacite, latite, andesite, greenstone, granite, silica sand, slate, nepheline syenite, quartz, or slag (recycled material).

As noted, cool granules reflect a significant portion of incident infrared light. In some cases, the cool granules may be formed of an inorganic material (such as those described above) bearing one or more coatings or layers of one or more infrared light reflecting pigments. A suitable pigment includes titanium dioxide, which yields a white appearance. Suitable pigments providing a yellow color include V-9415 and V-9416 (Ferro Corp., Cleveland, Ohio) and Yellow 195 (the Shepherd Color Company, Cincinnati, Ohio), all of which are considered yellow pigments.

In some cases, darker pigments may be used that have enhanced NIR reflectivity. These pigments include "10415 Golden Yellow", "10411 Golden Yellow", "10364 Brown", "10201 Eclipse Black", "V-780 IR BRN Black", "10241 Forest Green", "V-9248 Blue", "V-9250 Bright Blue", "F-5686 Turquoise", "10202 Eclipse Black", "V-13810 Red", "V-12600 IR Cobalt Green", "V-12650 Hi IR Green", "V-778 IR Brn Black", "V-799 Black", and "10203 Eclipse Blue Black" (all from Ferro Corp.); and Yellow 193, Brown 156, Brown 8, Brown 157, Green 187B, Green 223, Blue 424, Black 411, Black 10C909 (all from Shepherd Color Co.). Additional pigments of interest, some displaying enhanced infrared light reflectivity, are discussed in Sliwinski et al., U.S. Pat. Nos. 6,174,360 and 6,454,848, both of which are herein incorporated by reference, in their entirety.

The granules may be coated with one or more of these pigments using any desired technique or process. In some cases, the granules may be coated using an aqueous slurry of pigment, alkali metal silicate, an aluminosilicate, and an optional borate compound. The alkali metal silicate and the aluminosilicate act as an inorganic binder and are a major constituent of the coating. As a major constituent, this material is present at an amount greater than any other component and in some embodiments present at an amount of at least about 50 volume percent of the coating. The coatings from this slurry generally result in a ceramic.

Aqueous sodium silicate is the preferred alkali metal silicate due to its availability and economy, although equivalent materials such as potassium silicate may also be substituted wholly or partially therefore. The alkali metal silicate may be designated as $M_2O:SiO_2$, where M represents an alkali metal such as sodium (Na), potassium (K), mixture of sodium and potassium, and the like. The weight ratio of $SiO_2$ to $M_2O$ can range from about 1.4:1 to about 3.75:1. In some embodiments, ratios of about 2.75:1 and about 3.22:1 are particularly preferred, depending on the color of the granular material to be produced, the former preferred when light colored granules are produced, while the latter is preferred when dark colored granules are desired.

The aluminosilicate used can be a clay having the formula $Al_2Si_2O_5(OH)_4$. Another preferred aluminosilicate is kaolin, and its derivatives formed either by weathering (kaolinite), by moderate heating (dickite), or by hypogene processes (nakrite). Other commercially available and useful aluminosilicate clays for use in the ceramic coating of the granules in the present invention are the aluminosilicates known under the trade designations "Dover" from Grace Davison, Columbia, Md. and "Sno-brite" from Unimin Corporation, New Canaan, Conn.

The borate compound, may be sodium borate available as Borax® (U.S. Borax Inc., Valencia, Calif.); however, other borates may be used, such as zinc borate, sodium fluoroborate, sodium tetraborate-pentahydrate, sodium perborate-tetrahydrate, calcium metaborate-hexahydrate, potassium pentaborate, potassium tetraborate, and mixtures thereof. An alternative borate compound is sodium borosilicate obtained by heating waste borosilicate glass to a temperature sufficient to dehydrate the glass.

The inorganic substrate granules, which are preheated to a temperature range of about 125-140 degrees Centigrade, are then coated with the slurry to form a plurality of slurry-coated inorganic granules. The water flashes off and the temperature of the granules drops to a range of about 50-70 degrees Centigrade. The slurry-coated granules are then heated for a time and at a temperature sufficient to form a plurality of ceramic-coated inorganic granules. In some instances, the slurry-coated granules may be heated at a temperature of about 400 degrees Centigrade to about 530 degrees Centigrade for a time ranging from about 1 to about 10 minutes, although it will be recognized that shorter times may be employed at higher temperatures.

Methods of coating granules to form color-coated roofing granules are also described in Sloan, U.S. Pat. No. 3,479,201, which is hereby incorporated by reference herein in its entirety.

The infrared light reflecting film particles may be polymeric multilayer infrared light reflecting film particles and may be interspersed within the granules described above. The infrared light reflecting particles may have a mean size that is between about 50 micrometers and about 5 millimeters. In some instances, the infrared light reflecting film particles may have a mean size that is between about 0.5 millimeters and about 2 millimeters. The infrared light reflecting film particles may be considered in some cases as having an average major dimension that is less than about 2 millimeters, less than about 1 millimeter, or even less than about 0.5 millimeters. The film particles may have a thickness of about 0.02 to about 0.5 millimeters.

In some instances, the polymeric multilayer infrared light reflecting film particles are substantially transparent to selected visible light wavelengths. In order to minimize visual changes to the shingle to which the film particles have been applied, it is desirable that the polymeric multilayer infrared light reflecting film particles be at least substantially transparent to light within the visible light spectrum of about 400 to about 700 nanometers. Substantially transparent may be defined as permitting at least about 90 percent of incident visible light to be transmitted, or passed through.

Suitable infrared light reflecting film particles may be obtained from an optical film such as a multilayer optical film having alternating polymeric layer pairs where typically at least one alternating layer is birefringent and orientated.

The layers have different refractive index characteristics so that some light is reflected at interfaces between adjacent layers. The layers are sufficiently thin so that light reflected at a plurality of the interfaces undergoes constructive or destructive interference in order to give the film the desired reflective or transmissive properties.

For optical films designed to reflect light at ultraviolet, visible, or near-infrared wavelengths, each layer generally has an optical thickness (i.e., a physical thickness multiplied by refractive index) of less than about 1 micrometer. Thicker layers can, however, also be included, such as skin layers at the outer surfaces of the film, or protective boundary layers disposed within the film that separate packets of layers.

The reflective and transmissive properties of a multilayer optical film are a function of the refractive indices of the respective layers. Each layer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. In practice, the refractive indices are controlled by judicious materials selection and processing conditions.

A multilayer optical film may be made by co-extrusion of typically tens or hundreds of layers of two alternating polymers A, B, followed by optionally passing the multilayer extrudate through one or more layer multipliers, then casting through a film die, and then stretching or otherwise orienting the extrudate to form a final film. The resulting film is composed of typically tens or hundreds of individual layers whose thicknesses and refractive indices are tailored to provide one or more reflection bands in desired region(s) of the spectrum, such as in the visible or near infrared.

In order to achieve high reflectivities with a reasonable number of layers, adjacent layers preferably exhibit a difference in refractive index ($\Delta n_x$) for light polarized along the x-axis of at least 0.05. In some embodiments, if the high reflectivity is desired for two orthogonal polarizations, then the adjacent layers also exhibit a difference in refractive index ($\Delta n_y$) for light polarized along the y-axis of at least 0.05. In other embodiments, the refractive index difference $\Delta n_y$ can be less than 0.05 or 0 to produce a multilayer stack that reflects normally incident light of one polarization state and transmits normally incident light of an orthogonal polarization state.

If desired, the refractive index difference ($\Delta n_z$) between adjacent layers for light polarized along the z-axis can also be tailored to achieve desirable reflectivity properties for the p-polarization component of obliquely incident light. For ease of explanation, at any point of interest on a multilayer optical film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$.

Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

To maintain high reflectivity of p-polarized light at oblique angles of incidence, the z-index mismatch $\Delta n_z$ between layers can be controlled to be substantially less than the maximum in-plane refractive index difference $\Delta n_x$, such that $\Delta n_z \leq 0.5 * \Delta n_x$. More preferably, $\Delta n_z \leq 0.25 * \Delta n_x$. A zero or near zero magnitude z-index mismatch yields interfaces between layers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Multilayer optical films have been described in, for example, U.S. Pat. No. 3,610,724 (Rogers); U.S. Pat. No. 3,711,176 (Alfrey, Jr. et al.), "Highly Reflective Thermoplastic Optical Bodies For Infrared, Visible or Ultraviolet Light"; U.S. Pat. No. 4,446,305 (Rogers et al.); U.S. Pat. No. 4,540,623 (Im et al.); U.S. Pat. No. 5,448,404 (Schrenk et al.); U.S. Pat. No. 5,882,774 (Jonza et al.) "Optical Film"; U.S. Pat. No. 6,045,894 (Jonza et al.) "Clear to Colored Security Film"; U.S. Pat. No. 6,531,230 (Weber et al.) "Color Shifting Film"; PCT Publication WO 99/39224 (Ouderkirk et al.) "Infrared Interference Filter"; and US Patent Publication 2001/0022982 A1 (Neavin et al.), "Apparatus For Making Multilayer Optical Films", all of which are incorporated herein by reference.

In such polymeric multilayer optical films, polymer materials are used predominantly or exclusively in the makeup of the individual layers. Such films can be compatible with high volume manufacturing processes, and may be made in large sheets and roll goods.

The multilayer film can be formed by any useful combination of alternating polymer type layers. In many embodiments, at least one of the alternating polymer layers is birefringent and oriented. In some embodiments, one of the alternating polymer layer is birefringent and orientated and the other alternating polymer layer is isotropic. In one embodiment, the multilayer optical film is formed by alternating layers of a first polymer type including polyethylene terephthalate (PET) or copolymer of polyethylene terephthalate (coPET) and a second polymer type including poly (methyl methacrylate) (PMMA) or a copolymer of poly (methyl methacrylate) (coPMMA). In another embodiment, the multilayer optical film is formed by alternating layers of a first polymer type including polyethylene terephthalate and a second polymer type including a copolymer of poly (methyl methacrylate and ethyl acrylate). In another embodiment, the multilayer optical film is formed by alternating layers of a first polymer type including a glycolated polyethylene terephthalate (PETG—a copolymer ethylene terephthalate and a second glycol moiety such as, for example, cyclohexanedimethanol) or a copolymer of a glycolated polyethylene terephthalate (coPETG) and second polymer type including polyethylene naphthalate (PEN) or a copolymer of polyethylene naphthalate (coPEN). In another embodiment, the multilayer optical film is formed by alternating layers of a first polymer type including polyethylene naphthalate or a copolymer of polyethylene naphthalate and a second polymer type including poly(methyl methacrylate) or a copolymer of poly(methyl methacrylate). Useful combination of alternating polymer type layers are disclosed in U.S. Pat. Nos. 6,352,761 and 6,797,396, which are incorporated by reference herein.

Infrared light reflecting particles may be formed by slicing, dicing, chopping, grinding, mascerating or otherwise cutting multilayer optical films into small pieces having any suitable dimension, as discussed above. In some cases, infrared light reflecting particles may be formed by cutting up edge trimmings, startup, tailout and many defect portions of a multilayer film not suitable for other uses. This represents a recycling, or optimization of material.

A wavelength band may be defined as a range of wavelengths bounded by points representing 50 percent of maximum reflectance at the upper and lower wavelengths of the band edge. A band may be considered as having a width of about 150 nanometers. In some instances, a band may have a width of about 100 nanometers, about 200 nanometers, about 250 nanometers or even about 300 nanometers. An important band for infrared light reflection is between about 800 and about 1000 nanometers. Another important band is between about 1000 nanometers and about 1200 nanometers.

Infrared light reflection may be defined as reflecting at least about 10 percent of the incident infrared light. In some cases, infrared light reflection may be defined as reflecting at least about 20 percent, at least about 30 percent, at least about 40 percent or even at least about 50 percent of the incident infrared light. In some cases, infrared light reflection may be defined as reflecting at least a minimum portion of the incident infrared light within particular wavelengths, such as the bands noted above.

Some multilayer infrared light reflecting films (and hence particles made from such films) may reflect a substantial amount of infrared light throughout the infrared light spectrum. Some multilayer infrared light reflecting films may be tuned to reflect substantial amounts of only portions of the infrared light spectrum. In some cases, it may be useful to use more than one multilayer infrared light reflecting film (and particles made therefrom). For example, a first multilayer infrared light reflecting film tuned to reflect light in the 800 to 1000 nanometer band may be used in combination with a second multilayer infrared light reflecting film tuned to reflect light within the 1000 to 1200 nanometer band.

In one respect, the present invention pertains to a roofing shingle that includes a substrate, granules secured to the substrate, and a polymeric multilayer infrared light reflecting film particles that are secured relative to the substrate. The granules and the polymeric multilayer infrared light reflecting film particles are as discussed above with respect to the infrared light reflecting mixture.

A roofing shingle in accordance with an embodiment of the invention, including polymeric multilayer infrared light reflecting film particles, may exhibit significant solar reflectance, particularly in the infrared portion of the light spectrum. In some instances, a roofing shingle in accordance with the invention may exhibit a Total Solar Reflectivity (TSR) of at least about 25 percent, at least about 30 percent, at least about 35 percent, at least about 40 percent, at least about 45 percent, or even higher.

Inclusion of the polymeric multilayer infrared light reflecting film particles may provide a TSR that is at least about 5 percentage points higher than a similar shingle having the same substrate and granules, but not including the polymeric multilayer infrared light reflecting film particles. In some cases, the gain in TSR may be at least about 10 percentage points, at least about 15 percentage points, at least about 20 percentage points or even higher.

In some cases, the substrate may be an asphalt-impregnated felt backing or an asphalt-impregnated fiberglass backing. It is contemplated that the granules and the polymeric multilayer infrared light reflecting film particles may be added sequentially, with perhaps the granules added first and the light reflecting film particles added subsequently. If the light reflecting film particles are added subsequently, an appropriate adhesive may be used to assist in securing the film particles to the substrate and to the granules.

In some cases, the granules and the infrared light reflecting film particles may be mixed together, and then applied simultaneously to the substrate. Methods of securing granules to a substrate are known, and are described, for example, in U.S. Pat. Nos. 5,380,552 and 5,516,573, both of which are herein incorporated by reference in its entirely. In either case, it is believed that a substantial number of the infrared light reflecting film particles may fill in interstitial spaces existing between adjoining granules as well as cover portions of the granule surface.

In some instances, it may be desirable that the infrared light reflecting film particles have little or no visible effect on the shingles to which they have been applied. Shingles including the multilayer infrared light reflecting film particles may have an apparent color that is substantially similar to a color the shingle would have without the infrared light reflecting particles. There are several ways to quantify color.

CIELAB is the second of two systems adopted by CIE in 1976 as models that better showed uniform color spacing in their values. Color opposition correlates with discoveries that somewhere between the optical nerve and the brain, retinal color stimuli are translated into distinctions between light and dark, red and green, and blue and yellow. CIELAB indicates these values with three axes: L*, a*, and b*. The central vertical axis represents lightness (signified as L*) whose values run from 0 (black) to 100 (white). The color axes are based on the fact that a color cannot be both red and green, or both blue and yellow, because these colors oppose each other. On each axis, the values run from positive to negative. On the a-a' axis, positive values indicate amounts of red while negative values indicate amounts of green. On the b-b' axis, yellow is positive and blue is negative. For both axes, zero is neutral gray.

In some instances, it is contemplated that a shingle including the multilayer infrared light reflecting film particles has an L* value, an a* value and a b* value that are each no more than about 1 unit different from a shingle without the multilayer infrared light reflecting film particles. In some cases, each value generally varies less than about 0.5 units.

In one respect, the present invention pertains to a roofing shingle that includes a substrate, granules secured to the substrate, and a polymeric multilayer infrared light reflecting film that is secured relative to the substrate. In some instances, the film may be a discontinuous film such as a perforated film or a fibrous film. The granules are as discussed above with respect to the infrared light reflecting mixture, and may include both conventional and cool granules.

A roofing shingle in accordance with an embodiment of the invention, including a polymeric multilayer infrared light reflecting film, may exhibit significant solar reflectance, particularly in the infrared portion of the light spectrum. In some instances, a roofing shingle in accordance with the invention may exhibit a Total Solar Reflectivity (TSR) of at least about 30 percent, at least about 35 percent, at least about 40 percent, at least about 45 percent, or even higher.

In some instances, the multilayer infrared light reflecting film may be secured over the granules. In other cases, the multilayer infrared light reflecting film may be secured underneath the granules. The multilayer infrared light reflecting film may be secured either above or below the granules, regardless of whether the multilayer infrared light reflecting film is a continuous film or a discontinuous film.

A transparent polymer layer may be disposed between the multilayer infrared light reflecting film and the granules, such that the granules may be secured into or on the transparent polymer layer. The transparent polymer may be formed of a polymer having an index of refraction that is the same or substantially the same as one of the alternating polymer layers in the multilayer infrared reflecting film. In some instances, the transparent polymer may be the same as one of the alternating polymer layers, but may have a thickness sufficient for imbedding the granules therein. An example thickness would be at least as thick as the average granule size used.

In one respect, the present invention pertains to a method of increasing the total solar reflectance of an existing construction surface. The existing construction surface may include roofing materials such as asphalt shingles, aluminum and steel roofing shingles, clay tiles, flat roofs such as rubber membrane roofs and asphalt-coated roofs, siding materials, fenestration materials, hardscape materials such as asphalt or concrete driveways, concrete sidewalks, paver block driveways and sidewalks, roads and the like. As discussed above, increasing the total solar reflectance of a surface, particularly with respect to infrared light, may decrease or even substantially decrease temperature increases that would otherwise be caused by solar heating.

A solution including a carrier, an adhesive and a number of multilayer infrared light reflecting film particles may be applied to a construction surface. The solution may be applied using any suitable technique. In some instances, the solution may be sprayed onto the construction surface. The solution may, if desired, be applied like a paint, using rollers, brushes and the like. The solution may be wiped onto the construction surface.

The multilayer infrared light reflecting film particles are as described above. The adhesive may be any suitable adhesive or binder such as vinyl polymers, vinyl-acrylic polymers, acrylic polymers, vinyl-chloride acrylic polymers, styrene/butadiene copolymers, styrene/acrylate copolymers, vinyl acetate/ethylene copolymers, aminoalkyl resin, thermosetting acrylic resins, nitrocellulose resins, modified acrylic lacquer, straight chain acrylic lacquer, polyurethane resin, acrylic enamel resin, silyl group-containing vinyl resin, and combinations thereof.

Adhesives may be employed in securing the multilayer infrared light reflecting film particles to the construction surface. Examples include pressure sensitive adhesives, hot-melt adhesives, solvent-coated adhesives, heat activated adhesives and the like. These adhesive materials preferably are optically clear, diffuse and exhibit non-hazy and non-whitening aging characteristics. Furthermore, the adhesive materials should exhibit long term stability under high heat and humidity conditions. Suitable adhesive materials may include solvent, heat, or radiation activated adhesive systems. Pressure sensitive adhesive materials are normally tacky at room temperature and can be adhered to a surface by application of light to moderate pressure.

Additional examples of adhesive materials, whether pressure sensitive or not and useful in the present invention include those based on general compositions of polyacrylate; polyvinyl ether; diene-containing rubbers such as natural rubber, polyisoprene, and polyisobutylene; polychloroprene; butyl rubber; butadieneacrylonitrile polymers; thermoplastic elastomers; block copolymers such as styrene-isoprene and styrene-isoprene-styrene block copolymers, ethylene-propylene-diene polymers, and styrene-butadiene polymers; polyalphaolefins; amorphous polyolefins; silicone; ethylene-containing copolymers such as ethylene vinyl acetate, ethylacrylate, and ethylmethacrylate; polyurethanes; polyamides; polyesters; epoxies; polyvinylpyrrolidone and vinylpyrrolidone copolymers; and mixtures of the above.

The carrier may be any suitable carrier. In some cases, the carrier may be water. Once the solution has been applied, the carrier may be removed in any suitable manner to form an infrared light reflecting treated construction surface. In some instances, the construction surface may simply be permitted to dry as the solvent evaporates. If desired, heat or air movement may be provided to facilitate evaporation.

In some instances, the construction surface may be tested to determine a solar reflectance value prior to applying the solution. Once the solution has been applied and dried to form a treated construction surface, the solar reflectance of the treated construction surface may be tested. The solar reflectance of the treated construction surface may be greater than the solar reflectance of the untreated construction surface. The increase in solar reflectance may be reflected in the treated construction surface having a total solar reflectance that is at least 5 percentage points higher than that of the untreated construction surface. In some instances, the difference in total solar reflectance may be at least 10 percentage points, at least 15 percentage points, or even greater.

In some instances, a roofing shingle may include a biological growth inhibitor or a self-cleaning component to reduce or eliminate microbial growth on the shingle. In some cases, the biological growth inhibitor or self-cleaning component may be added to the solution applied to the construction surface.

In some embodiments, the biological growth inhibitor may include metal compounds, particularly oxides such as metal oxides selected from $TiO_2$, $ZnO$, $WO_3$, $SnO_2$, $CaTiO_3$, $Fe_2O_3$, $MoO_3$, $Nb_2O_5$, $Ti_xZr_{(1-x)}O_2$, $SiC$, $SrTiO_3$, $CdS$, $GaP$, $InP$, $GaAs$, $BaTiO_3$, $KNbO_3$, $Ta_2O_5$, $Bi_2O_3$, $NiO$, $Cu_2O$, $CuO$, $SiO_2$, $MoS_2$, $InPb$, $RuO_2$, $CeO_2$, $Ti(OH)_4$, or combinations thereof.

Other copper compounds useful as biological growth inhibitors include cupric bromide, cupric stearate, cupric sulfate, cupric sulfide, cuprous cyamide, cuprous thiocyannate, cuprous stannate, cupric tungstate, cuprous mercuric iodide, and cuprous silicate, or mixtures thereof. The term biological growth inhibitor includes both those materials which kill micro biota and those which significantly retard the growth of micro biota. In other embodiments, the biological growth inhibitor may comprise organic components such as those described in PCT Publication WO 2002/10244. Photocatalysts may also be used.

In other embodiments, a biocide or biological growth inhibitor may be present on the construction surface as a separate element. For example, copper containing roofing granules, available from 3M Company, St. Paul, Minn., as #7000, #7022, #7050, or #7070, may be used to provide a roofing shingle having an initial solar reflectivity approximating that of a roofing shingle having only the non-white granules, but providing an extended life during which the reflectivity remains greater than an arbitrarily selected fraction of the initial reflectivity. Biological growth inhibitors are typically used in an effective amount to provide a biological growth inhibition for an extended period of time. Examples of such time periods include from 2 to 5 years, 3 to 7 years, 4 to 10 years, 5 to 15 years, greater than 10 years, greater than 15 years, and greater than 20 years.

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

FIG. 1 is a diagrammatic cross-section of a roofing shingle 100. Roofing shingle 100 includes a substrate 102, which as discussed above may be a felt or fiberglass substrate. An asphalt layer 104 is disposed on substrate 102. A granule layer 106 is disposed on asphalt layer 104. As discussed above, granule layer 106 may include both conventional and cool, infrared light reflecting granules. Granule layer 106 may also include the polymeric multilayer infrared light reflecting film particles discussed herein.

Figure 2:
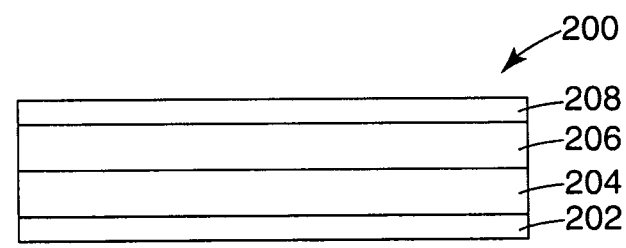
FIG. 2 is a diagrammatic cross-section of a roofing shingle in accordance with an embodiment of the present invention.

FIG. 2 is a diagrammatic cross-section of a roofing shingle 200. Roofing shingle 200 includes a substrate 202, which as discussed above may be a felt or fiberglass substrate. An asphalt layer 204 is disposed on substrate 202. A granule layer 206 is disposed on asphalt layer 204. As discussed above, granule layer 206 may include both conventional and cool, infrared light reflecting granules. A film layer 208 is disposed over granule layer 206. Film layer 208 may include a multilayer infrared light reflecting film such as those discussed herein.

Figure 3:
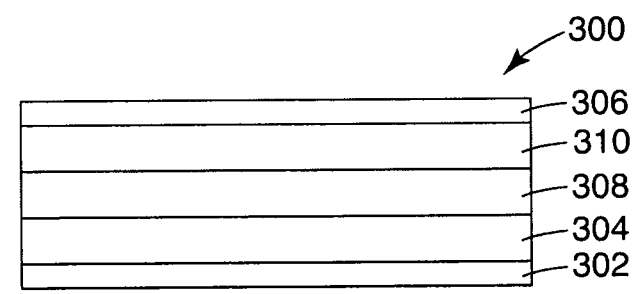
FIG. 3 is a diagrammatic cross-section of a roofing shingle in accordance with an embodiment of the present invention.

FIG. 3 is a diagrammatic cross-section of a roofing shingle 300. Roofing shingle 300 includes a substrate 302, which as discussed above may be a felt or fiberglass substrate. An asphalt layer 304 is disposed on substrate 302. A film layer 308 is disposed over asphalt layer 304, and may include a multilayer infrared light reflecting film such as those discussed above. A polymer layer 310 is disposed over film layer 308. Polymer layer 310 may be at least substantially transparent to infrared light, and may have a thickness sufficient to permit a granule layer 306 to be at least partially embedded into polymer layer 310.

EXAMPLES

An infrared light reflecting window film sample, made according to the procedure described in U.S. Pat. No. 6,797,396 was used for the following examples. This film is a PET/coPMMA multilayer polymer that is visually optically clear and essentially colorless. The film transmits strongly in the visible band and reflects strongly in the near IR band.

Total Solar Reflectance (TSR) measurements were made with a Device and Services Solar Spectrum Reflectometer Model SSR-ER. This instrument complies with ASTM Method C 1549 as approved on Sep. 1, 2004. Calibration was completed using the blackbody cavity and the diffuse ceramic tile standard supplied with the instrument. Reflectance measurements were collected at an angle of 20 degrees from the incident light at the following four wavelengths, 380 nm, 500 nm, 650 nm, and 1220 nm. These four measurements were then combined by the instrument's software which uses a weighted sum to approximate the response for incident solar radiation. An air mass of 1.5 was used.

In each Example, "with film" refers to a film disposed over an asphalt shingle, while "with particle" refers to film particles disposed over an asphalt shingle. On average, the film particles were rectangular in shape, with dimensions of about 1 millimeter by about 2 millimeters.

| Shingle | TSR (Shingle alone) | TSR (With Film) | TSR (With Particles) |
|---|---|---|---|
| Wausau 5100 black granules* on asphalt shingle | 2.7 | 33.6 | 13.9 |
| Wausau 5180 Cool black granules* on asphalt shingle | 19.2 | 42.7 | 25.1 |
| Wausau 9380 Cool White granules* on asphalt shingle | 31.9 | 52.1 | 42.0 |

*available from 3M Company

In each case, the best TSR was obtained by covering the shingle with the infrared light reflecting film, as explained by the 100 percent surface coverage over the shingle. While the samples including film particles show dramatic TSR improvements, it should be noted that the TSR values are reduced due to a reduced level of coverage over the shingle. In these tests, areal coverage was estimated to range from 30 to 50 percent.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. An infrared light reflecting mixture, comprising:
    inorganic granules having a mean size ranging from about 0.1 millimeters to about 5 millimeters; and
    polymeric multilayer infrared light reflecting film particles comprising a plurality of alternating polymeric layers, wherein the particles exhibit a mean size ranging from about 50 micrometers to about 5 millimeters, and further wherein the polymeric multilayer infrared light reflecting film particles are at least about 90 percent transparent to incident light within the visible spectrum of about 400 to about 700 nanometers, wherein the relative weight percent of inorganic granules to polymeric multilayer infrared light reflecting film particles is about 99.95 to about 70 weight percent inorganic granules and about 0.05 to about 30 weight percent polymeric multilayer infrared light reflecting film particles.

2. The infrared light reflecting mixture of claim 1, wherein the inorganic granules include infrared light reflecting inorganic granules.

3. The infrared light reflecting mixture of claim 2, wherein the infrared light reflecting inorganic granules comprise a metal oxide.

4. The infrared light reflecting mixture of claim 2, wherein the infrared light reflecting inorganic granules comprise an infrared light reflecting pigment.

5. The infrared light reflecting mixture of claim 2, wherein the infrared light reflecting inorganic granules comprise an infrared light reflecting coating.

6. The infrared light reflecting mixture of claim 1, wherein the inorganic granules have a mean size ranging from about 0.3 millimeters to about 1.8 millimeters.

7. The infrared light reflecting mixture of claim 1, wherein the polymeric multilayer infrared light reflecting film particles comprise polymeric multilayer optical film particles.

8. The infrared light reflecting mixture of claim 1, wherein the polymeric multilayer infrared light reflecting film particles are visually optically clear and essentially colorless.

9. The infrared light reflecting mixture of claim 1, wherein the polymeric multilayer infrared light reflecting film particles include alternating polymeric layer pairs where at least one alternating layer is birefringent and orientated.

10. The infrared light reflecting mixture of claim 1, wherein the polymeric multilayer infrared light reflecting film particles comprise alternating layers of a first polymer layer including polyethylene terephthalate and a second polymer layer including poly methyl methacrylate.

11. The infrared light reflecting mixture of claim 1, wherein the polymeric multilayer infrared light reflecting film particles have a mean size ranging from about 0.5 millimeters to about 2 millimeters.

12. The infrared light reflecting mixture of claim 1, wherein the polymeric multilayer infrared light reflecting film particles have a mean thickness ranging from about 0.02 millimeters to about 0.5 millimeters.

* * * * *